United States Patent [19]

Jocz

[11] 4,364,111

[45] Dec. 14, 1982

[54] ELECTRONICALLY CONTROLLED VALVE ACTUATOR

[75] Inventor: Armin E. Jocz, Ada, Mich.

[73] Assignee: Westran Corporation, Muskegon, Mich.

[21] Appl. No.: 151,666

[22] Filed: May 20, 1980

[51] Int. Cl.$^3$ .................... G05B 11/32; F16K 31/04
[52] U.S. Cl. .................... 364/175; 251/133; 318/286; 318/466; 364/510
[58] Field of Search ............ 364/509, 510, 110, 107, 364/108, 130, 174, 175; 318/290, 256, 282, 466, 467, 468, 286, 673, 685, 696; 137/554, 624.13, 624.11, 625.65, 625.64, 596.17, 487.5; 251/129, 133, 134, 135, 136

[56] References Cited

U.S. PATENT DOCUMENTS

| | | | |
|---|---|---|---|
| 3,488,030 | 1/1970 | Hulme et al. | 251/134 |
| 3,500,380 | 3/1970 | Vessee | 251/129 X |
| 3,756,282 | 9/1973 | Knutson | 251/133 X |
| 4,097,786 | 6/1978 | Lund | 251/133 X |
| 4,099,704 | 6/1978 | Okumura et al. | 251/134 |
| 4,139,153 | 2/1979 | Engholdt | 251/133 X |

Primary Examiner—Joseph F. Ruggiero

Attorney, Agent, or Firm—Gifford, VanOphem, Sheridan & Sprinkle

[57] ABSTRACT

A valve actuator is provided for use in conjunction with a valve having an actuating member movable between a first position in which the valve is closed and a second position in which the valve is open. The valve actuator comprises a reversible motor having its output mechanically connected to the actuating member. The actuation of the motor is controlled by a circuit having a microprocessor. An optical sensor on the valve actuating member provides an input signal to the microprocessor indicative of the position of the valve and the position of the valve corresponding to both the open and closed position are stored in a memory accessible to the microprocessor. When the actuating member attains a desired position, the microprocessor is programmed to generate a stop signal which deactivates the motor. Strain gages connected to either the actuating member or the motor output shaft generate an output signal to deactivate the motor when the torque exceeds a predetermined amount while an override circuit permits an increased torque to be applied to the actuating member following the initial activation of the motor in order to break the valve free.

10 Claims, 2 Drawing Figures

ELECTRONICALLY CONTROLLED VALVE ACTUATOR

BACKGROUND OF THE INVENTION

I. Field of the Invention

The present invention relates generally to valve actuators and, more particularly, to an electronically controlled valve actuator.

II. Description of the Prior Art

There are a number of previously known valve actuators having an actuating member, typically a shaft, which is movable or rotatable from a first position in which the valve is closed and a second position in which the valve is open. A number of these previously known valve actuators also include a reversible electric motor mechanically connected to the valve actuating member for moving the actuating member, and thus the valve, between its closed and open position and vice versa. These previously known motor driven valve actuators, however, suffer from a number of disadvantages.

When a valve is in a closed position, a relatively great amount of torque must be initially supplied by the motor of these previously known valve actuators in order to break the valve open in contrast to the average dynamic torque required for moving the valve actuating member from its closed and to its open position. The previously known valve actuators have employed a mechanical hammer blow which impacts the actuator for a period in the order of ten miliseconds. The effectiveness of such an impact, however, is dimensioned by the amount of valve load inertia thus requiring even greater impacts from the mechanical hammer to ensure that the valve is broken open from its closed position.

In order to accomplish the necessary hammer blow to break the valve open from its closed position, it has been necessary for the previously known valve actuators to employ specially designed torque motors which are capable of creating the necessary hammer blow. Such torque motors, however, are very expensive in both acquisition and maintenance costs.

A still further disadvantage of these previously known motor driven valve actuators is the difficulty encountered in the initial set up of the valve. Ideally, the simple activation of a switch button to move the valve from its open position and to into its closed position, or vice versa, is most desirable. However, in order to accomplish this it has been necessary to undergo tedious and time-consuming mechanical adjustments and even gear changes on the valve actuator to ensure that the motor moves the valve completely between the open and closed position and then deactivates. In addition, many of these previously known motor driven valve actuators have required adjustments of potentiometers or other variable electrical components in order to initially set up the valve. Such adjustments, however, are also tedious and time-consuming and, moreover, are subject to change over age thus requiring readjustment.

A still further disadvantage of these previously known motor driven valve actuators is that with such actuators the valve can be actuated only from its closed position and to its open position, or vice versa, and that it was not possible to stop the valve at selected or predetermined intermediate positions. In many types of valve applications, however, it would be desirable to open the valve to one or more predetermined intermediate positions between its fully open and fully closed position.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
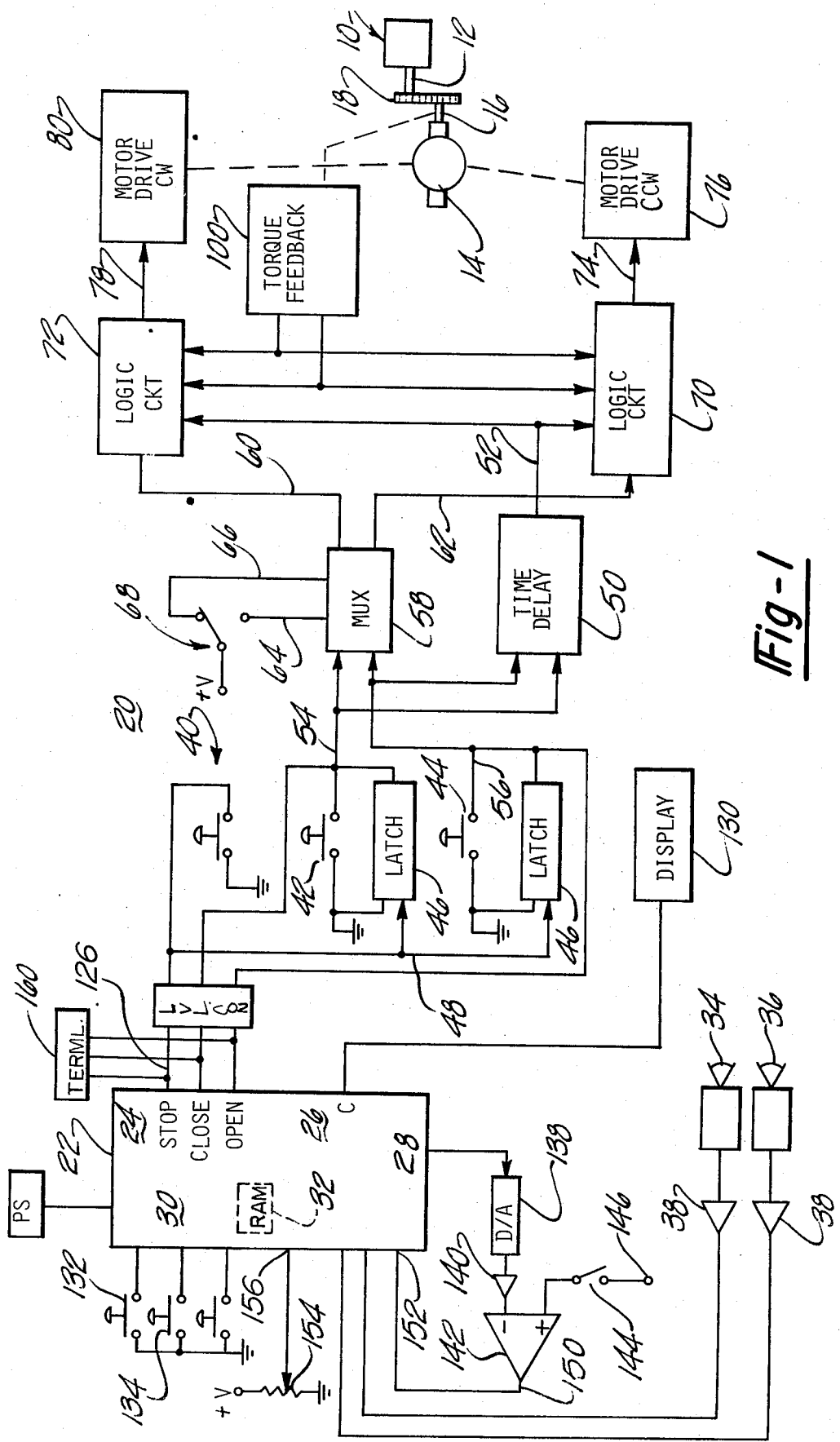
FIG. 1 is a block diagrammatic view illustrating a preferred embodiment of the valve actuator control system of the present invention.

With reference first to FIG. 1, a preferred embodiment of the valve control according to the present invention is thereshown for use with a valve 10 which is illustrated only diagrammatically. The valve 10 includes an actuating member 12 which is movable between a first position in which the valve 10 is fully closed and an open position in which the valve 10 is fully open. A motor 14 has an output shaft 16 which is mechanically connected to the actuating member by any conventional means, such as a gearing arrangement 18. Furthermore, the motor 14 is a reversible electric motor so that rotation of the motor output shaft 16 in a first direction moves the valve actuating member 12 from its closed position and towards its open position and vice versa. The motor 14, moreover, can comprise a relatively inexpensive and conventional AC motor as will become hereinafter apparent.

Still referring to FIG. 1, the valve actuator control of the present invention comprises an electronic circuit 20 having a microprocessor 22 with I/O ports 24, 26, 28 and 30. The microprocessor 22 illustrated in FIG. 1 is a Rockwell R6500/1 microprocessor and, as such, includes on board random access memory 32. Other types of microprocessors, with or without on board random access memory, can alternatively be employed without deviation from either the spirit or scope of the present invention.

Three manually operated push button switches 40, 42 and 44 are provided to respectively stop the actuation of the valve, to actuate the valve to move from an open and to a closed position and to actuate the valve to move from a closed and to an open position. The switches 42 and 44, furthermore, each include a latch circuit 46 which effectively maintains the switch 42 or 44 in a closed position, once depressed, until a signal from line 48 is received from the microprocessor 22 or when the stop push button 40 is depressed. The output from the CLOSE push button 42 is connected to a CLOSE input on the microprocessor port 24 while, similarly, the output from the OPEN push button 44 is connected to an OPEN input on the microprocessor port 24. The output from the push button switches 42 and 44 are also connected as inputs to a time delay circuit 50 which generates a signal on its output 52 for a predetermined time period, for example one second, following the depression of either switch 42 or 44.

The outputs 54 and 56 from the CLOSED and OPEN switches 42 and 44, respectively, are fed to a multiplexer 58 having two output lines 60 and 62. A further pair of inputs 64 and 66 are fed as input signals to the multiplexer 58 and are selectively switched to a high state by a STOP switch 68. With the switch 68 in one position, the depression of the OPEN push button 44 generates an output signal on line 62 from the multiplexer 58 while depression of the CLOSE push button switch 42 generates an output signal on the multiplexer output 60. Conversely, when the switch 68 is switched to its other position, depression of the OPEN push button switch 44 generates an output signal on line 60 while depression of the CLOSE push button switch 42 generates an output signal on the multiplexer output 62. The purpose of the multiplexer 58 will be subsequently described.

The multiplexer output 62 is connected as an input signal to a logic circuit 70 while the multiplexer output line 60 is fed as an input signal to a second logic circuit 72. The logic circuit 70 includes an output 74 which, when active, activates a motor drive circuit 76 which rotatably drives the motor 14 in a counterclockwise direction. Similarly, the logic circuit 72 includes an output signal 78 which, when active, activates a motor drive circuit 80 which drives the motor in the opposite or clockwise direction. Since the logic circuit 70 and 72 and motor circuits 76 and 78 are substantially identical to each other, only the logic circuit 70 will be described in detail, in being understood that a like description shall also be applicable to the logic circuit 72. The motor drive circuits 76 and 80 are of conventional construction and will not be further described.

Figure 2:
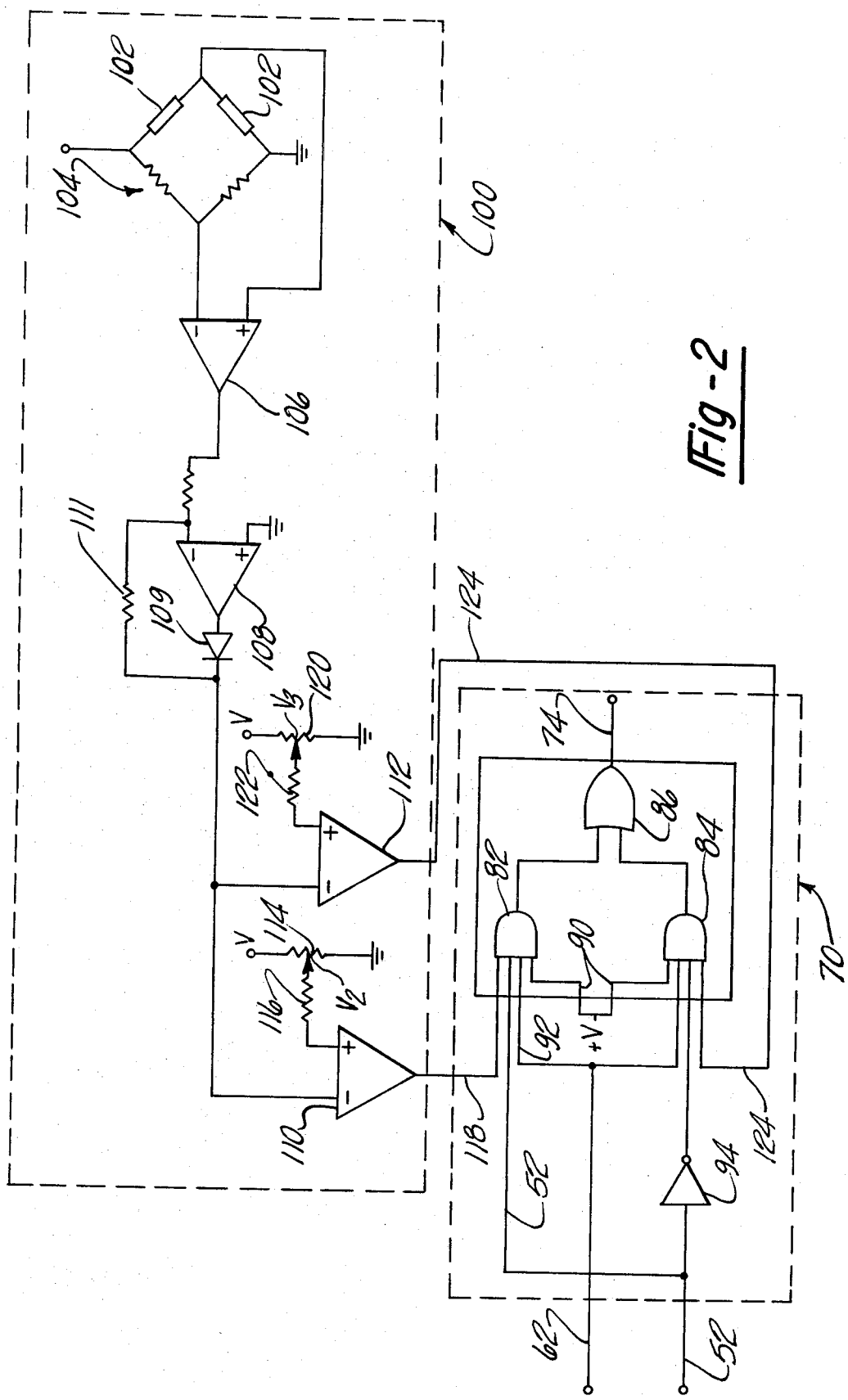
FIG. 2 is a schematic view illustrating a portion of the circuit shown in FIG. 1.

Referring now to FIG. 2, the logic circuit 70 is thereshown in greater detail and comprises a pair of quad input AND gates 82 and 84 having their output connected as inputs to an OR gate 86. The output from the OR gate 86 forms the output 74 from the logic circuit 70 and to the motor drive unit 76. One input 90 to each AND gate 82 and 84 is held at a high level by the power supply V. The output 62 from the multiplexer 58 also forms one input 92 to each AND gate 82 and 84. The output line 52 from the time delay 50 forms an input to the AND gate 82 while an inverter 94 inverts this time delay output 52 and this inverted signal is connected as an input signal to the other AND gate 84. Because of the inversion of the time delay output 52, only one of the AND gates 82 and 84 can be active at any given time.

A torque feedback circuit 100 (FIG. 1) also provides an input signal to the logic circuit 72 and 70 which is indicative of the torque of the motor output shaft 16 or, alternatively, the valve actuating member 12. As will become hereinafter apparent, the torque feedback circuit 100 provides a signal to the logic circuits 70 and 72 to deactivate the motor 14 when the torque on the motor 14 exceeds a predetermined amount indicative, for example, of a jammed valve condition. By deactivating the motor when the torque exceeds a maximum value, damage to the motor 14 and, likewise, damage to the valve 10 can be prevented.

The torque feedback circuit 100 is shown in detail FIG. 2 and comprises a pair of strain gages 102 electrically connected in a resistance bridge 104 having its outputs connected to a differential amplifier 106. The strain gages 102 are physically mounted on the motor output shaft 16, or the valve actuating member 12 or an associated component so that the output from the differential amplifier 106 is proportional to the motor torque. The output from the differential amplifier 106, which can be either positive or negative, is connected to inverting input of a further differential amplifier 108. A diode 109 is coupled in series with the output of the amplifier 108 while a feedback resistor 111 connects the output of the diode 109 to the inverting input of the amplifier 108. The amplifier 108, resistor 111 and diode 109 together function to invert the output from the amplifier 106 only if the output from the amplifier is negative and thus functions as a rectifier. This rectified output from the amplifier 108, or alternatively from the resistor 111, is electrically connected to the inverting inputs of two comparators 110 and 112.

A power supply V is connected through a variable resistor 114 and current limiting resistor 116 to the non-inverting input of the comparator 110 so that a constant but adjustable voltage V2 is supplied to the non-inverting input of the comparator 110. Consequently, the output 118 from the comparator 110 remains positive until the voltage at the inverting input exceeds the voltage of the non-inverting input at which the comparator output 118 switches to a low level.

Similarly, a voltage supply V is electrically connected through a variable resistor 120 and current limiting resistor 122 to the non-inverting input of the second comparator 112. Consequently, an adjustable but constant positive voltage V3 is applied to the non-inverting input of the comparator 112. Thus, the output 124 from the comparator 112 remains in a high state until voltage at its inverting input exceeds the voltage applied to its non-inverting input at which time the comparator output 124 goes to a low state.

The variable resistors 114 and 120 are adjusted so that the voltage V3 applied to the non-inverting input of the comparator 112 exceeds the voltage V2 which is applied to the non-inverting input of the comparator 110. The output 118 from the comparator 110 thus will remain in a high state until the motor output torque exceeds a first predetermined amount at which time the comparator output 118 goes to a low state. Likewise, the output 124 from the comparator 112 will remain in a high state until the motor torque exceeds a second predetermined amount at which time the comparator output 124 will assume a low state. The function of the comparators 110 and 112 will be subsequently described.

Referring still to FIG. 2, the output 118 from the comparator 110 is coupled as an input signal to the AND gate 82 while the output 124 from the comparator 112 is coupled as an input signal to the AND gate 84. As previously described, the depression of either the CLOSE switch 42 or the OPEN switch 44 causes the time delay 50 to generate a high signal on its output 52 only after a predetermined elapsed time period which is approximately 1 second. Thus, following the depression of either the OPEN or CLOSE switches 42 and 44, the AND gate 82 is deactivated by the time delay input 52 while the inverted time delay signal is coupled as a high signal to the other AND gate 84. The AND gate 84 is thus active, assuming that the output 124 of the comparator 112 is high, i.e., motor output torque does not exceed the torque as determined by the variable resistor 120, which in turn activates the OR gate 86 and provides an output signal on the output line 74 from the logic circuit 70. Conversely, if the motor output torque exceeds the amount determined by the variable resistor 120, indicative of a jammed valve condition, the output 124 of the comparator 112 will assume a low state and thus deactivate both the AND gate 84, the OR gate 86 and the output 74 from the logic circuit 70.

Following the period of time delay signal, approximately 1 second, from the delay circuit 50, the AND gate 84 is deactivated by the inverter 94 so that an activating signal on a logic circuit output 74 is obtained only when the AND gate 82 is active. The AND gate 82 will remain active as long as the torque on the motor output does not exceed the value as determined by the variable resistor 114 and its corresponding comparator 110.

The use of the two comparators 110 and 112 and the time delay circuit 50 permits a different maximum torque to be applied by the motor 14 for a relatively short period of time, for example 1 second, following the initial closure of either the OPEN or CLOSE switches 44 and 42. In a conventional application this torque is appoximately 50% greater than the torque required to switch the comparator 110, i.e., the average dynamic torque required to drive the valve activating member, and is both necessary and sufficient to break the valve open when in a closed position. Alternatively, however, the torque required to switch the comparator 110 can be adjusted from near zero to 100% of the average dynamic rating of the motor 14 while the torque required to switch the comparator 112 can be varied from near zero to approximately 150% of the average dynamic torque rating of the motor 14 in accordance with the application requirements. In some application, it may even be desirable to preset the comparator 112 to a lower maximum torque valve than the comparator 110, for example whan a soft start opening or closure of the valve is desired.

The output 74 from the logic circuit 70 is fed to the motor drive circuit 76. The motor drive circuit 76 is of conventional construction and, when its input 74 is active, drives the motor 14 in a counterclockwise direction. As previously set forth, the other logic circuit 72 is substantially identical to the logic circuit 70 and the motor drive circuit 80 is substantially identical to the motor drive circuit 76. The motor drive circuit 80, however rotatably drives the motor 14 in the opposite or clockwise direction.

Most valves are opened when the motor 14 is driven in a counterclockwise direction and, conversely, are closed when driven in a clockwise direction. In the event, however, that this is reversed, the switch 68 coupled to the multiplexer 58 is operable to switch the multiplexer outputs 60 and 62. Thus, when the multiplexer switch 68 is in the other position and the OPEN switch 44 is depressed, the logic circuit 72 and motor drive circuit 80 are instead activated and rotatably drive the motor 14 in a clockwise direction.

Referring again particularly to FIG. 1, a pair of optical transducers 34 and 36 are spaced 90 electrical degrees apart and are optically coupled with either the output shaft 16 from the motor 14 or the valve actuating member 12. Since the optical transducers 34 and 36 are 90 electrical degrees apart, they can sense the direction of rotation of the motor shaft 16 or valve actuating member 12, as the case may be, and generate an electrical signal representative of the position of the valve actuator 12. This electrical output signal from the transducers 34 and 36 is amplified by the amplifiers 38 and the outputs from the amplifiers 38 are connected to two input lines on the microprocessor port 30.

The inputs from the optical transducers 34 and 36 thus provide an input signal to the microprocessor 22 indicative of the current position of the valve actuating member 12, and thus the position of the valve 10, and this information is stored in the microprocessor random access memory 32. In addition, values corresponding to the position of the valve actuator 12 when the valve is fully open and also when fully closed are also stored within the microprocessor memory 32. The microprocessor 22, moreover, is programmed to deactivate the motor 14 by generating a stop signal on its STOP output 126 on port 24 when the valve actuator 12 attains its desired position. This stop signal also deactivates the latches 46 which correspondingly deactivate the logic circuits 70 and 72 and the motor drive circuits 76 and 80.

For example, assuming that the valve was fully closed and it desired to move the valve to its fully open position, the OPEN switch 44 is depressed which activates the motor drive circuit 76 in the previously described fashion thus moving the valve from its closed and towards an open position. The microprocessor 22 tracks the current position of the valve actuator 12 via the optical transducers 34 and 36 and compares the actual position of the valve actuator 12 with a value stored in the memory 32 indicative of a fully open position. When the valve attains its fully open position, the microprocessor 22 is programmed to generate an output signal along its stop output 126 and the stop output 120 is used to deactivate the switch latches 46 and thus deactivate the logic circuit 70 and its motor drive 76.

Still referring to FIG. 1, a numeric display 130, such as an LED display, is preferably electrically connected to the microprocessor port 26. The display 130 thus provides an output signal indicative of the degree of opening or closure of the valve 10.

The microprocessor 22 also provides a convenient means for establishing the OPEN and CLOSE limits of the valve 10. To accomplish this, the valve 10 is first moved to a CLOSE position and, thereafter, a switch 132 coupled to a pin on the microprocessor port 30 is depressed whereupon the position of the valve actuating member 12 as read by the transducers 34 and 36 is stored as a zero in the memory 32 as the limit of the valve closure. Thereafter, the valve can be mechanically moved to its fully OPEN position whereupon a further switch 134 coupled to a pin on the microprocessor port 30 is depressed. Upon closure of the switch 134, the position of the valve actuator 12 as determined by the optical transducers 34 and 36 is also stored as 100 in the memory 32 as the valve fully OPEN position. The procedure thus greatly simplifies the initial set up of the valve and completely eliminates the previously known necessity for potentiometer adjustments and/or other mechanical adjustments of the valve.

In an optional mode of operation the microprocessor 22 is programmed to produce a digital signal on its port 28 indicative of the actual or current position of the valve 10. The port 28 is connected to a digital/analog (D/A) converter 138 and the output from the D/A converter 138 is electrically coupled via an amplifier 140 to the inverting input of a comparator 142. The non-inverting input of the comparator 142 is selectively coupled by a switch 144 to a transducer input 146. When the switch 144 is closed, the comparator output 150 is representative of the difference or error between the actual position of the valve as determined from the output on the microprocessor port 28 and the desired position as represented by the analog signal from the transducer input 146. The actual analog signal to the transducer input 146 can take any desired form. The output 150 from the comparator 142 in turn is connected to an input pin 152 on the microprocessor port 30 which determines what direction the motor should be actuated in order to bring the valve position in conformity with the input demanded by the transducer input 146. For example, the comparator output 150 assumes a low state in the analog signal on its inverting input exceeds the signal on its non-inverting input and vice versa.

Thus, when the switch 144 is closed, the microprocessor 22 can control the valve actuation between any desired intermediate position or positions between fully open and fully closed. Under microprocessor control, the microprocessor 22 generates output signals on the STOP, CLOSE and OPEN pins on the microprocessor port 24, which are connected in parallel with the STOP, CLOSE and OPEN switches 40, 42 and 44, respectively, to selectively control the valve actuation.

Still referring to FIG. 1, a variable resistor 154 is also connected between a power source V and one input 156 on the microprocessor port 30. The adjustment of the variable resistor 154 provides an adjustment of the dead band to prevent dithering of the valve in an attempt to exactly match the input demanded from the transducer input 146. For example, if relatively accurate intermediate valve openings are required, the dead band is adjusted relatively narrow so that the motor will be deactivated only when the valve is accurately positioned. Such a narrow dead band setting, however, will result in more constant hunting and dithering of the valve. Conversely, if only an inaccurate intermediate valve opening position is required, the dead band can be set relatively wide so that once the valve is opened to any position within the dead band, the motor will be deactivated.

Still referring to FIG. 1, a terminal 160 is preferably connected in parallel with the stop, close and open pins on the microprocessor port 24. The terminal 160 would permit external control and/or monitoring of the control circuit by an external computer system.

From the foregoing, it can be seen that the valve actuator control circuit 20 of the present invention is advantageous in several different respects. First the initial set up of the valve is greatly simplified and the necessity for potentiometer adjustment and/or mechanical adjustments of the valve actuator is completely eliminated. Instead, the valve is mechanically moved from an OPEN and to a CLOSE position and the switches 132 and 134 are closed at the appropriate time which stores the OPEN and CLOSE positions of the valve within the computer memory 32. Thus, the complete set up of the valve can occur in less than a few minutes.

A still further advantage of the valve actuator control circuit of the present invention is the application of a relatively great torque, for example 150% of the average dynamic torque, for a relatively long period of time, i.e., approximately 1 second, which is sufficient to break the valve OPEN from its CLOSE position. This is in sharp contrast to the previously known valve actuators which require an impact or other extremely high torque for only a short period of time, i.e., in the order of 10 milliseconds. The present invention thus allows the the use of relatively inexpensive standard AC motors instead of the previously required high torque motors with the valve actuator.

A still further advantage of the present invention is that the transducer input 146 permits the valve to be opened to any desired intermediate position or positions. Moreover, the accuracy of the valve opening to these intermediate positions can also be controlled by the potentiometer 154 which controls the dead band.

The present invention is further advantageous in that the torque feedback circuit 100 deactivates the motor when the torque on the motor shaft exceeds certain predetermined limits which would be indicative of a jammed valve condition. The torque feedback prevents damage to both the motor and also to the valve components.

Having described my invention, however, many modifications thereto will become apparent to those skilled in the art to which it pertains without deviation from the spirit of the invention as defined by the scope of the appended claims.

I claim:

1. For use in conjunction with a valve having an actuating member movable between a first position in which said valve is closed and a second position in which said valve is open, a valve actuator comprising:

reversible motor means having an output mechanically connected to the actuating member, means for selectively activating said motor means to move said actuating member from either of said first or second position and toward the other of said first or second position, means for repeatedly determining the actual position of said actuating member as said actuating member moves from either of said first or second position and toward the other of said first or second position, means responsive to said determining means for automatically deactivating said motor means when said actuating member is at said other of said first or second position, and wherein said motor activating and deactivating means further comprises electrical circuit means, memory means accessible to said circuit means, said circuit means having means for storing upon operator command the output from said position determining means as values in said memory means corresponding to said first and second positions for said actuating member.

2. The invention as defined in claim 1 and further comprising means for measuring the torque of the motor output and means operable after the activation of said motor means and responsive to said torque measuring means for deactivating said motor means when said torque exceeds a first predetermined value for a predetermined time period following the initial activation of said motor means and, following said predetermined time period, for deactivating said motor means when said torque exceeds a second predetermined value, said first torque value being greater than said second torque value.

3. The invention as defined in claim 2 wherein said first torque value is substantially one and one half said second torque value and wherein said predetermined time period is substantially one second.

4. The invention as defined in claim 1 wherein said electrical circuit means comprises means for inputting the electrical output signal from said position determining means, means for comparing said inputted signal with said first or second value and for deactivating said motor means when said inputted signal equals said first or second value.

5. The invention as defined in claim 1 and further comprising means for displaying the current position of the valve actuating member.

6. The invention as defined in claim 1 wherein said motor actuating means comprises an OPEN momentary closure switch and a CLOSE momentary closure switch, means for latching either said OPEN or said CLOSE switch in an electrically closed state following closure of either said OPEN or said CLOSE switch, and wherein said deactivating means comprises means for deactivating said latch means.

7. The invention as defined in claim 6 and further comprising multiplexer means for selectively controlling the direction of rotation of said motor means upon closure of said OPEN or said CLOSE switch.

8. The invention as defined in claim 1 wherein said circuit means comprises a microprocessor.

9. For use in conjunction with a valve having an actuating member movable between a first position in which said valve is closed and a second position in which said valve is open, a valve actuator comprising:

reversible motor means having an output mechanically connected to the actuating member, means for selectively activating said motor means to move said actuating member from either of said first or second position, means for automatically deactivating said motor means when said actuating member is at said other of said first or second position, means for measuring the torque of the motor output and means operable after the activation of said motor means, and responsive to said torque measuring means for deactivating said motor means when said torque exceeds a first predetermined value for a predetermined time period following the initial activation of said motor means and, following said predetermined time period, for deactivating said motor means when said torque exceeds a second predetermined value, said first torque value being greater than said second torque value.

10. The invention as defined in claim 9 wherein said first torque value is substantially one and one half said second torque value and wherein said predetermined time period is substantially one second.

* * * * *